(12) United States Patent
Matsuishi

(10) Patent No.: US 6,488,132 B2
(45) Date of Patent: Dec. 3, 2002

(54) DISC BRAKE ASSEMBLY HAVING SHARED TORQUE-RECEIVING COMPONENTS

(75) Inventor: Kazuyuki Matsuishi, Aichi-ken (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/919,342

(22) Filed: Jul. 30, 2001

(65) Prior Publication Data

US 2002/0007989 A1 Jan. 24, 2002

Related U.S. Application Data

(63) Continuation of application No. 09/243,012, filed on Feb. 3, 1999, now abandoned.

(30) Foreign Application Priority Data

Feb. 10, 1998 (JP) ............................................... 10-44581

(51) Int. Cl.⁷ ............................................... F16D 65/38
(52) U.S. Cl. ................................... 188/73.39; 188/72.6
(58) Field of Search ............................... 188/71.1, 71.4, 188/72.1, 72.4, 72.6, 73.2, 73.39, 73.31, 73.46, 106 F

(56) References Cited

U.S. PATENT DOCUMENTS

| | | | |
|---|---|---|---|
| 3,318,421 A | 5/1967 | Van House et al. | 188/106 F |
| 3,321,049 A | 5/1967 | Swift | 188/71.9 |
| 3,342,291 A | 9/1967 | Warwick et al. | 188/71.8 |
| 3,613,515 A | * 10/1971 | Swande, Jr. et al. | 188/170 |
| 3,651,896 A | 3/1972 | Fannin | 188/71.8 |
| 3,837,437 A | 9/1974 | Martins | 188/71.8 |
| 4,162,720 A | 7/1979 | Haraikawa | 188/71.9 |
| 5,150,772 A | 9/1992 | Pantale et al. | 188/72.4 |
| 5,607,033 A | 3/1997 | Naedler et al. | 188/71.8 |
| 5,845,747 A | 12/1998 | Rike et al. | 188/72.4 |

FOREIGN PATENT DOCUMENTS

| | | |
|---|---|---|
| DE | 26 57 015 A 1 | 9/1978 |
| DE | 27 18 003 A 1 | 10/1978 |
| GB | 1 490 795 | 11/1977 |
| GB | 2 012 012 A | 7/1979 |

* cited by examiner

Primary Examiner—Jack Lavinder
Assistant Examiner—Thomas J. Williams
(74) Attorney, Agent, or Firm—Seed IP Law Group PLLC

(57) ABSTRACT

In one embodiment, a disc brake assembly for use with a rotor includes a parking disc brake and a pair of service disc brakes. The parking disc brake is provided between the two service disc brakes, the parking and service disc brakes being disposable in a circumferential direction along the rotor. At least one component part of at least one service disc brake is used as a torque-receiving part of the parking disc brake. In another embodiment, the torque-receiving part is a caliper. In another embodiment, the torque-receiving part is a carrier. In yet another embodiment, the hydraulic type service disc brake is a floating-caliper type. In still another alternate embodiment, at least one tightening part is shared to install the adjacent side of the service disc and the parking disc brake on a stationary part of a vehicle.

18 Claims, 10 Drawing Sheets

DISC BRAKE ASSEMBLY HAVING SHARED TORQUE-RECEIVING COMPONENTS

CROSS-REFERENCE TO RELATED APPLICATION

This application is a continuation of U.S. patent application Ser. No. 09/243,012, filed Feb. 3, 1999, now abandoned.

TECHNICAL FIELD

This invention relates to a disc brake assembly for use with a rotor and suitable for a vehicle, such as an automobile or a commercial vehicle. More specifically, this invention relates to improvements of a disc brake assembly having two types of brakes, i.e., a service disc brake and a parking disc brake.

BACKGROUND OF THE INVENTION

FIGS. 12 and 13 disclose a disc brake assembly in accordance with the prior art. This type of disc brake assembly comprises two fixed-caliper service disc brakes 11 and a mechanical floating-caliper parking disc brake 12 between the two fixed-caliper service disc brakes 11. The parking disc brake 12 and the service disc brakes 11 are peripherally distributed along a disc rotor 10 with equal intervals.

Calipers 11a of the respective service disc brakes 11 are fixed by two installation bolts 14 on a mounting bracket 13 which is a stationary part of the vehicle. The parking disc brake 12 includes a carrier 12b that supports a parking brake caliper 12a that is fixed on the mounting bracket 13 by second installation bolts 15.

The service disc brakes 11 include a pair of frictional pads (not shown in the diagram) that are pressed to the side surfaces of the rotor 10 by a fluid pressure operation mechanism built into the service disc brakes 11, thereby causing braking effect. And the parking disc brake 12 includes a pair of friction pads 12c, 12d that are pressured to the side surface of the rotor 10 by the mechanical operation mechanism built in the parking disc brake 12, thereby causing brake effect.

The above-described disc brake has several disadvantages. For example, the parking disc brake 12 has the carrier 12b as a component. Thus, both the carrier 12b and the second installation bolts 15 that fix the carrier 12b on the mounting bracket 13 require higher material costs, working costs, and surface treatment costs.

Also, because the parking disc brake 12 needs to be larger in the circumferential direction of the rotor 10 for the carrier 12b, the size of the parking disc brake 12 is increased. Since the disc brake needs to be a bit larger, it has disadvantages in the weight and the manufacturing cost as well as the fuel consumption of the vehicle.

SUMMARY OF THE INVENTION

This invention is intended to improve the above-points. To that end, the invention provides a smaller device with a lower cost. In one embodiment, a disc brake assembly comprises two hydraulic type service disc brakes that press a disc rotor from opposite sides to cause a braking effect, and further including a mechanical floating-caliper type disc brake for a parking brake, wherein the mechanical floating-caliper type parking disc brake is provided between the two hydraulic type service disc brakes which are disposed in the circumferential direction of the disc rotor with a certain interval, and wherein component parts of the two hydraulic type service disc brakes are used as a torque-receiving part of the mechanical floating-caliper type parking disc brake. In an alternate embodiment, the hydraulic type service disc brake is a fixed-caliper type. In another embodiment, the torque-receiving part is a caliper.

In yet another embodiment, the hydraulic type service disc brake is a floating-caliper type. In another embodiment, the torque-receiving part is a carrier.

In still another embodiment, a disc brake further includes tightening parts that attach said mechanical floating-caliper type parking disc brake on a stationary part, the tightening parts also attaching said hydraulic type service disc brake on the stationary part. Finally, in another embodiment, the mechanical floating-caliper type parking disc brake includes a spring chamber type operating mechanism.

DETAILED DESCRIPTION OF THE INVENTION

The present invention is directed toward disc brake systems and methods therefore. Specific details of certain embodiments of the invention are set forth in the following description, and in FIGS. 1–11, to provide a thorough understanding of such embodiments. A person of ordinary skill in the art, however, will understand that the present invention may have additional embodiments, and that the invention may be practiced without several of the details described in the following description.

Figure 1:
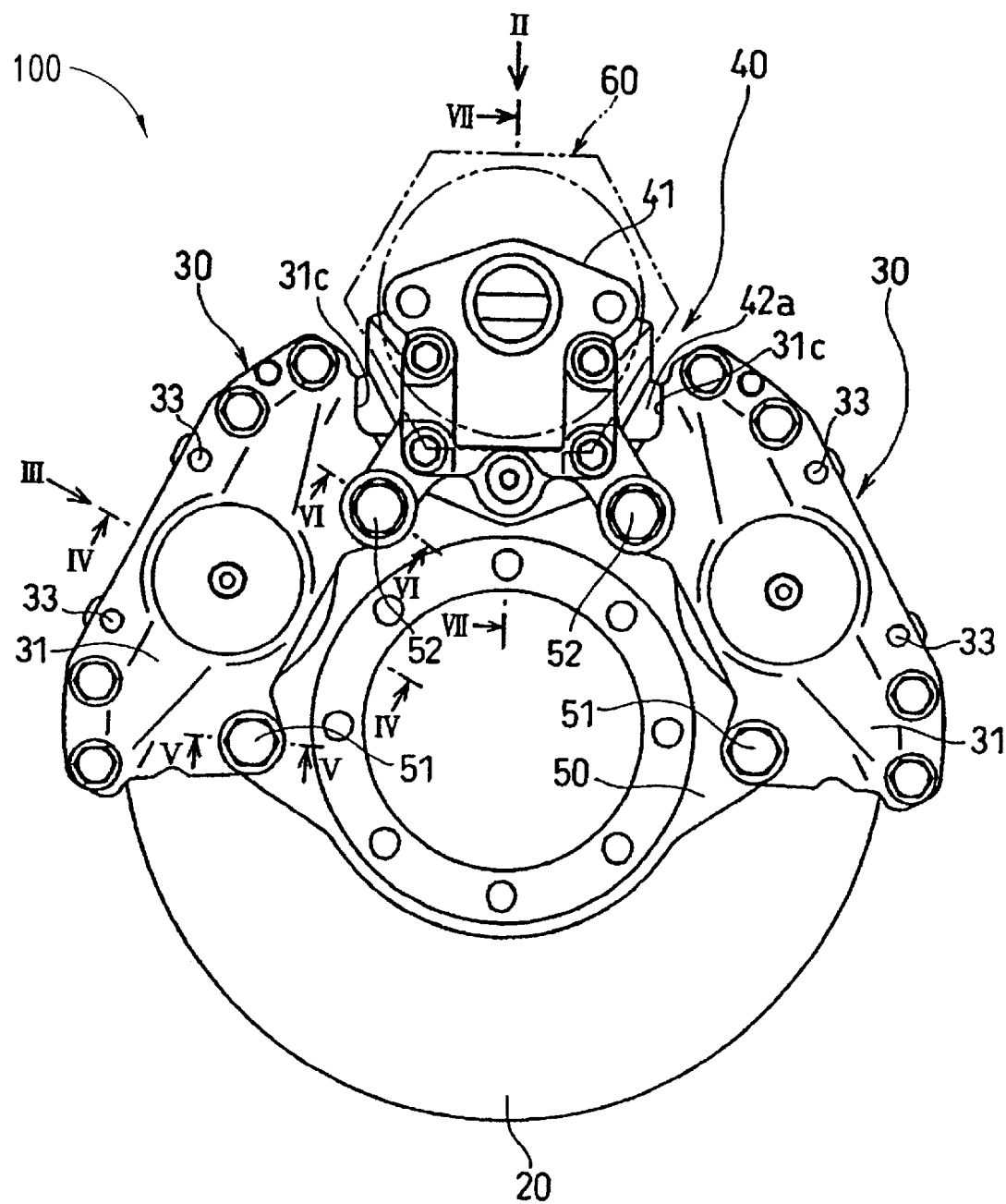
FIG. 1 is a front view of an embodiment of a disc brake assembly in accordance with the invention.
Figure 2:
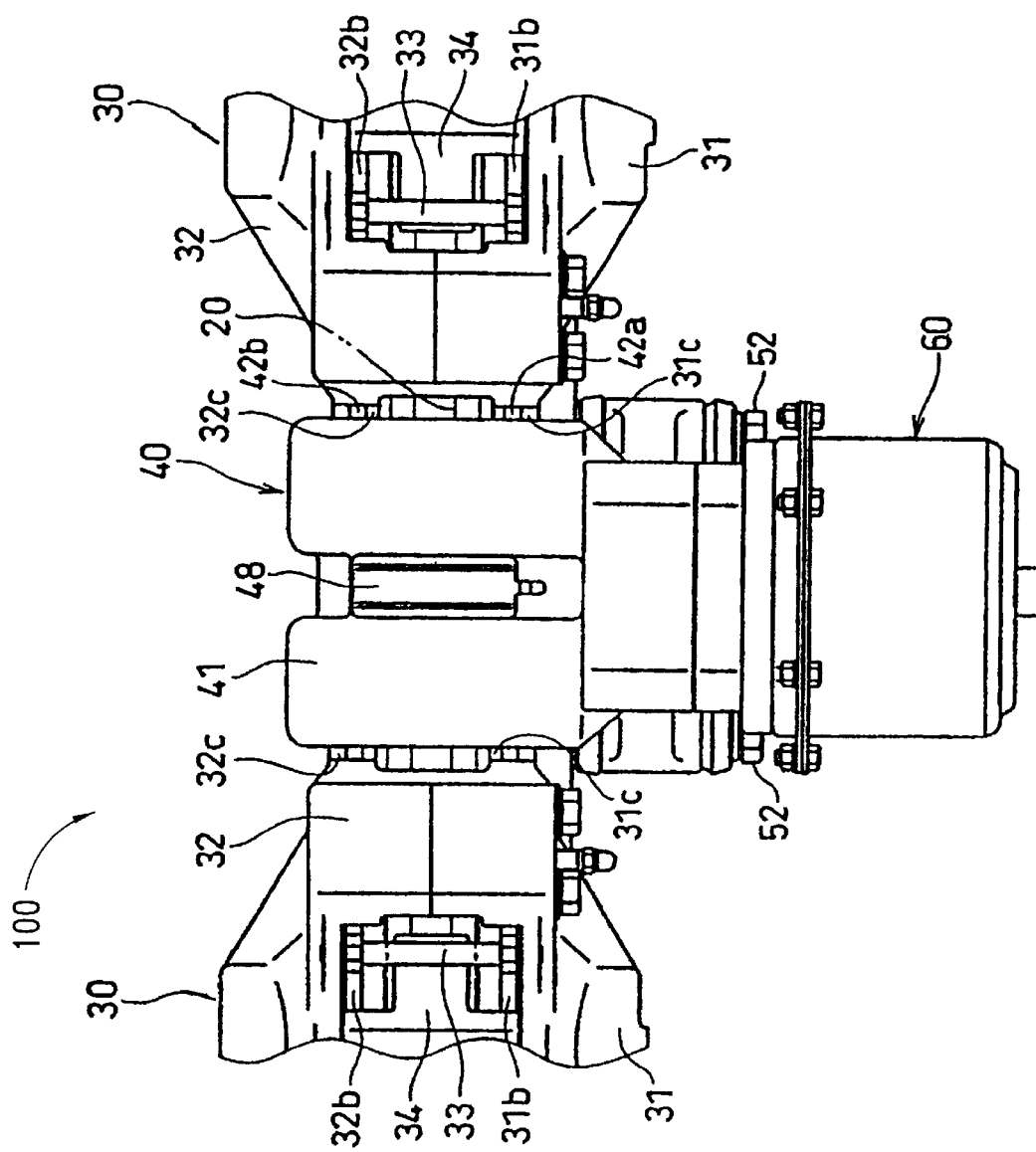
FIG. 2 is a plan view of the disc brake assembly of FIG. 1 as viewed in the direction of arrow II.

In one embodiment according to the invention, shown on FIGS. 1 and 2, a disc brake assembly 100 includes two hydraulic service disc brakes 30 circumferentially distributed along a rotor 20, and a mechanical parking disc brake 40 provided between the service disc brakes 30, wherein the service disc brakes 30 and the parking disc brake 40 are designed so that a part of one of the service disc brakes 30 may work as a torque-receiving part of the parking disc brake 40, and an installation bolt for the parking disc brake 40 may also serve as the installation bolt for one of the service disc brakes 30.

The two service disc brakes 30 shown in FIGS. 1 and 2 are of the fixed-caliper hydraulic type. These service disc brakes apply braking by pressing against opposite sides of the rotor 20. The service disc brakes 30 are offset above a horizontal line passing through the center of the rotor 20 of FIG. 1 and are placed approximately symmetrically with respect to a vertical line passing through the center of the rotor 20.

Figure 3:
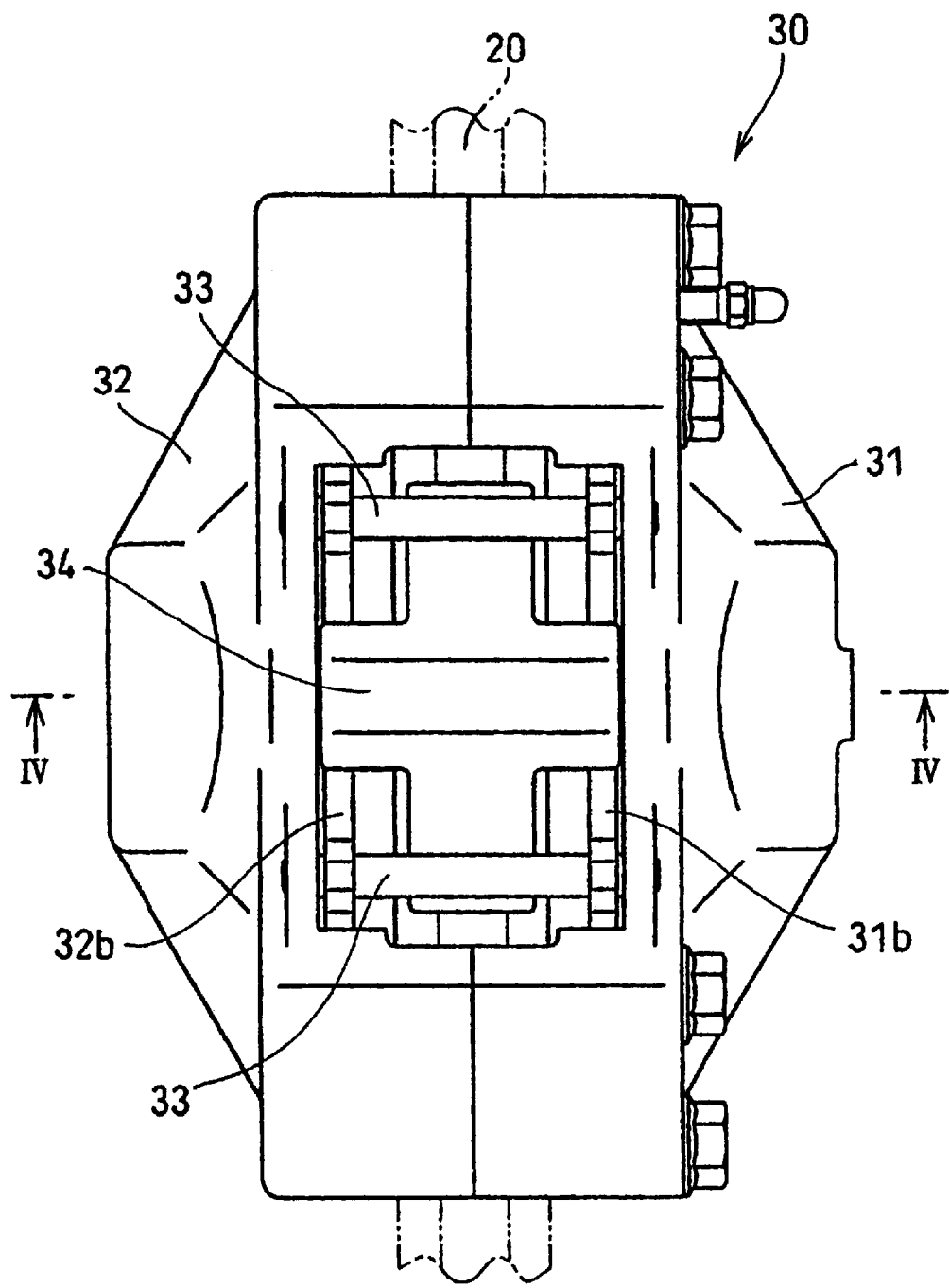
FIG. 3 is a plan view of the disc brake assembly of FIG. 1 as viewed in the direction of arrow III.
Figure 4:
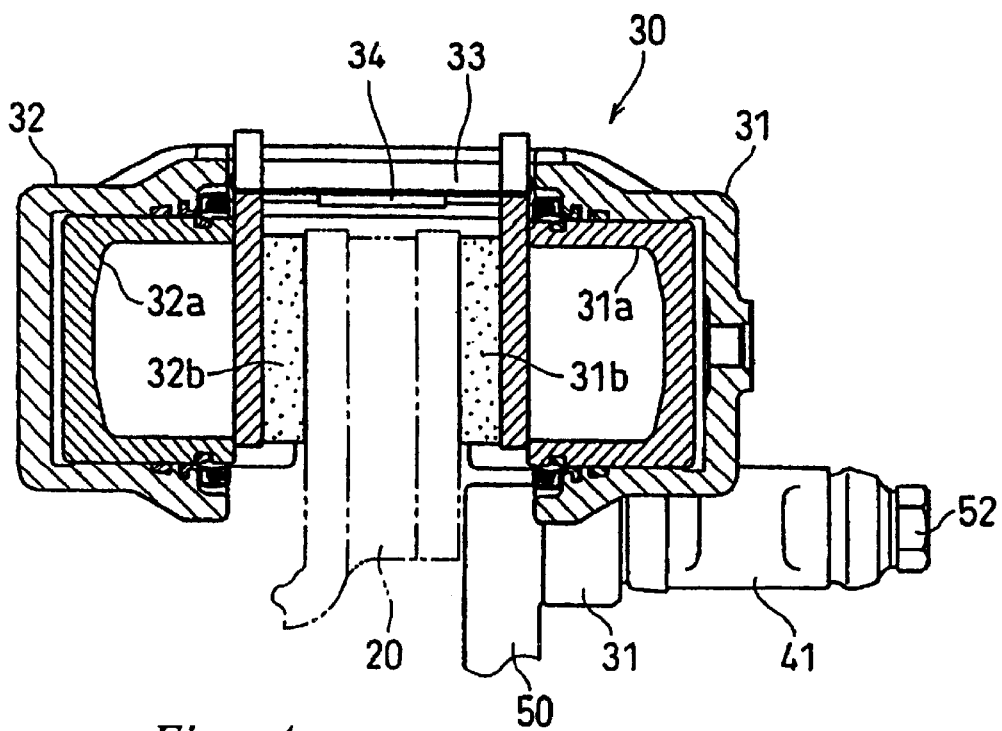
FIG. 4 is a cross sectional view of the disc brake assembly of FIG. 1 taken along line IV—IV.

FIG. 3 illustrates a plan view, and FIG. 4 illustrates a partial cross sectional view, of the service disc brake 30. In this embodiment, the service disc brake 30 includes an inner caliper 31 having an inner piston 31a therein, and an outer caliper 32 having an outer piston 32a therein, the inner and outer piston 31a and 32a being slidably provided along the sides of the rotor 20. The inner and outer calipers 31 and 32 have portions that cover the periphery of the rotor 20 and are integrated by bolts 35 (see FIG. 1) along the butt joints of both calipers 31 and 32. An inner pad 31b and an outer pad 32b face inner and outer surfaces of the rotor 20, respectively, and are slidably supported by a pair of hunger pins 33 disposed between the inner and outer calipers 31 and 32. The end surfaces of both the inner and outer pads 31b and 32b are also slidably mounted on rails (not shown) of the calipers 31 and 32. A first antirattle spring 34 extends between each of the inner and outer pads 31b and 32b and the hunger pins 33.

In order to apply braking, the inner and outer pistons 31a and 32a are projected to press both the inner and outer pads 31b and 32b against the side surfaces of the rotor 20 by a fluid pressure created, for example, by stepping on a brake pedal.

Figure 5:
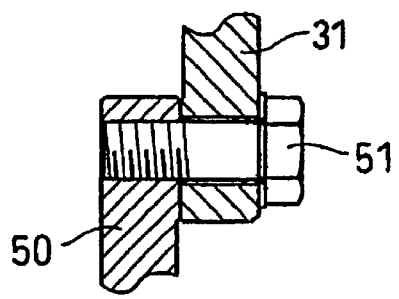
FIG. 5 is a cross sectional view of the disc brake assembly of FIG. 1 taken along line V—V.

As shown in FIG. 1, a first end of the inner caliper 31 opposite from the parking disc brake 40 is attached to a mounting bracket 50 (i.e., a stationary part of the vehicle) by an installation bolt 51. FIG. 5 illustrates a cross sectional view of the installation bolt 51, which is similar to the conventional method.

A second end of the inner caliper 31 situated proximate to the parking disc brake 40, and a guide bush 53, are mounted on the mounting bracket 50 by a guide bolt 52 (see FIG. 1). The parking disc brake 40 has a parking brake caliper 41 that slidably engages the guide bush 53, as best seen in FIG. 6.

Figure 6:
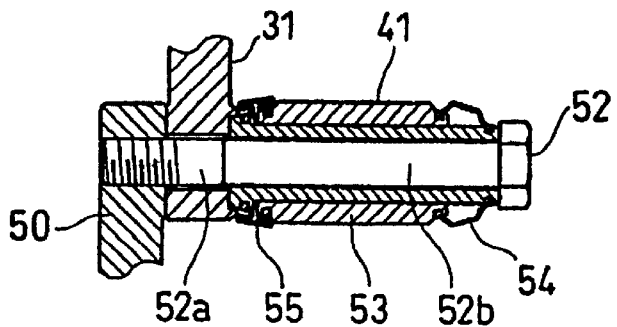
FIG. 6 is a cross sectional view of the disc brake assembly of FIG. 1 taken along line VI—VI.

As shown in FIG. 6, a screw 52a formed only on a top end of the guide bolt 52 is screwed into the mounting bracket 50, and the guide bush 53 covers a shaft 52b of the guide bolt 52. The parking brake caliper 41 is slidably supported along the longitudinal direction of the guide bolt 52 via the guide bush 53. An inner dust boot 55 extends between the parking brake caliper 41 and the inner caliper 31, and an outer dust boot 54 extends between the parking brake caliper 41 and the guide bush 53. The inner and outer dust boots 54, 55 prevent an object from interfering in the sliding portion of the parking brake caliper 41 of the parking disc brake 40.

The guide bolts 52 serves at least two functions. First, the guide bolts 52 installs both adjacent portions of the parking disc brake 40 and the service disc brakes 30, and second it supports the parking disc brake 40 under the floating condition, as described more fully below.

As shown in FIGS. 1 and 2, the parking disc brake 40 is a mechanical type disc brake that presses the rotor 20 from opposite sides of the rotor 20 and is provided on an upper part of the vertical line passing through the center of the rotor 20. In this embodiment, the need for an extra torque-receiving part (such as the carrier 12b in the above-explained conventional technology) only for the parking disc brake 40 is eliminated by using the component parts of the two service disc brakes 30 as a torque-receiving part of the parking disc brake 40.

As described above, the mechanical parking disc brake 40 comprises the parking brake caliper 41, the caliper slidably supported on the guide bush 53 in the axial direction of the rotor 20, the guide bush 53 are covering the guide bolt 52. The parking disc brake 40 also includes inner and outer parking brake pads 42a, 42b provided on inner and outer rails 31c, 32c of the inner and outer calipers 31, 32, respectively, of the above-explained service disc brakes 30, and a mechanical operating mechanism 200 to directly press the inner parking brake pad 42a.

The mechanical operating mechanism 200 is explained with reference to FIG. 7. A sleeve 43 is forcefully fitted in a cylinder 41a of the parking brake caliper 41. An adjustment nut 44 is slidably inserted in the sleeve 43, and a tappet 45 is screwed into the adjustment nut 44 to press against the inner parking brake pad 42a. A return spring 66 is compressed between the parking brake caliper 41 and the adjustment nut 44 and applies a spring force to continuously abut a washer 46 installed with the adjustment nut 44 against a roller 65 engaged with the ditch of an eccentric cam 62a of an operating lever 62.

First adjustment teeth 44a provided on the adjustment nut 44 engage second adjustment teeth 47a provided on a circumferential surface of a large diameter portion of an adjustment shaft 47 provided parallel to the adjustment nut 44. The adjustment nut 44 is rotated by operating the adjustment shaft 47 externally from the parking brake caliper 41 to manually adjust the amount of the exposed post-screwed portion of the tappet 45 relative to the adjustment nut 44.

A spring chamber assembly 60 is fastened to the parking brake caliper 41 and comprises a built-in spring (not shown in the diagram) and a push rod 61 strokable by the spring force of the built-in spring, wherein the pressing force of the push rod 61 is transmitted as the pressure force of the tappet 45 via the operating lever 62, etc.

The operating lever 62 comprises the eccentric cam 62a, a pair of linkages 62b integrally extendable from both sides from the axial direction of the eccentric cam 62a, and a receiving part 62c abutting against the push rod 61, the receiving part 62c is a pin bridged between the facing linkages 62b, both ends of which are fixed to the facing linkages 62b.

A second antirattle spring 48 is provided between the parking brake caliper 41 and the inner and outer parking brake pads 42a, 42b to prevent the rattle of the parking brake pads 42a, 42b. A needle bearing 63 and a sheet bearing 64 are engaged with the operating lever 62 to provide a smooth rotation of the operating lever 62. A fixed anchor 67 supports the needle bearing 63. A plate 68 is inserted between a flange of the adjustment nut 44 and a return spring 66 and has a low friction layer that does not transmit a torsion force from the return spring 66 to the adjustment nut 44. A dust boot 69 extends between the tappet 45 and the sleeve 43. Overall, the mechanical operating mechanism 200 is similar to the conventional device.

In this embodiment of the invention, the end surfaces (in the circumferential direction of the rotor 20) of both the inner and outer parking pads 42a, 42b of the parking disc brake 40 are slidably attached in the axial direction of the rotor 20 to the adjacent end surfaces (the inner and outer rails 31c and 32c formed at the inner caliper 31 and the outer caliper 32) of the service disc brakes 30. Thus, the braking torque of the parking disc brake 40 is supported by the service disc brakes 30, that is the component parts of the service disc brakes 30 are used as the torque-receiving parts of the parking disc brake 40.

The braking operation of the disc brake 40 as a parking brake is explained next. The parking brake is operated to eject air in the spring chamber assembly 60. As best seen in FIG. 7, the push rod 61 is projected by the spring force of the built-in spring (not shown) and the receiving part 62c of the operating lever 62 is pressed in the direction of the rotor 20.

Figure 7:
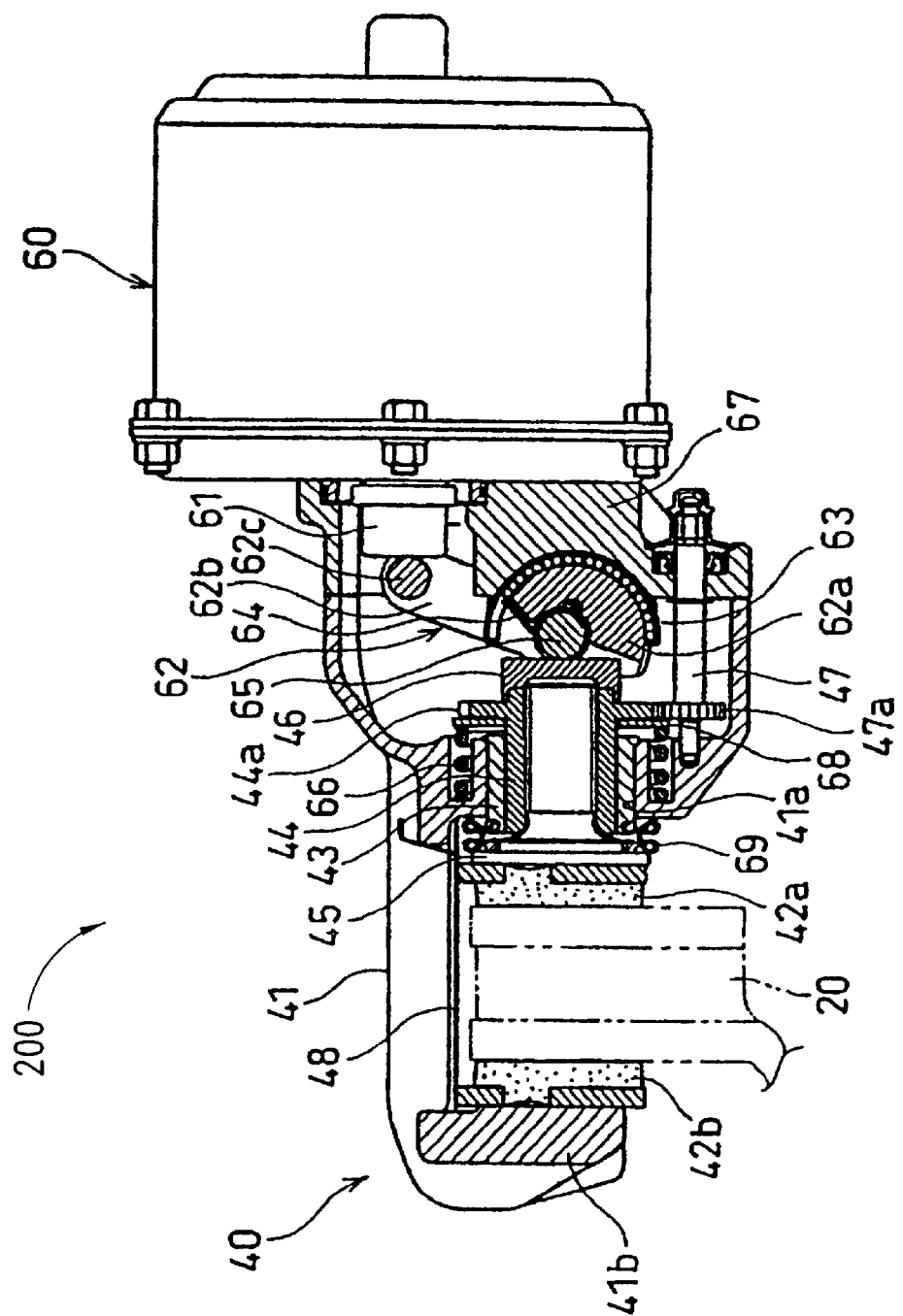
FIG. 7 a cross sectional view of the disc brake assembly of FIG. 1 taken along line VII—VII.

As such, the eccentric cam 62a integrated with each linkage 62b rotates counter-clockwise in FIG. 7. The eccentric cam 62a presses the washer 46 in the direction of the rotor 20 via the roller 65. The pressure force is transmitted to the tappet 45 via the adjustment nut 44, and the tappet 45 presses the inner parking brake pad 42a into contact with the rotor 20. By a reaction force, the parking brake caliper 41 moves backward in the opposed direction of the tappet 45, causing the reaction part 41b of the parking brake caliper 41 to press the outer parking brake pad 42b in the direction of the rotor 20. Thus, the inner and outer parking brake pads 42a and 42b press the rotor 20 in opposite directions to effectuate braking.

FIGS. 8–11 illustrate another embodiment of a disc brake assembly 300 having two hydraulic, floating-caliper type service disc brakes 130. In the following description, components which are similar or identical to the components of the above-described embodiments are designated with similar numbers, and the explanation of such components is not repeated.

Each floating-caliper type service disc brake 130 comprises a carrier 70 fixed to the mounting bracket 50, the installation bolts 51, and the guide bolts 52. A floating caliper 131 having a reaction part 131c is slidably supported by first and second guiding means 71 and 72, respectively, and is thereby fixed to the carrier 70. Inner and outer pads 31b and 32b are slidably provided on a rails 70b (see FIG. 8) of the carrier 70, the rails 70b extending in the axial direction of the rotor 20.

Figure 8:
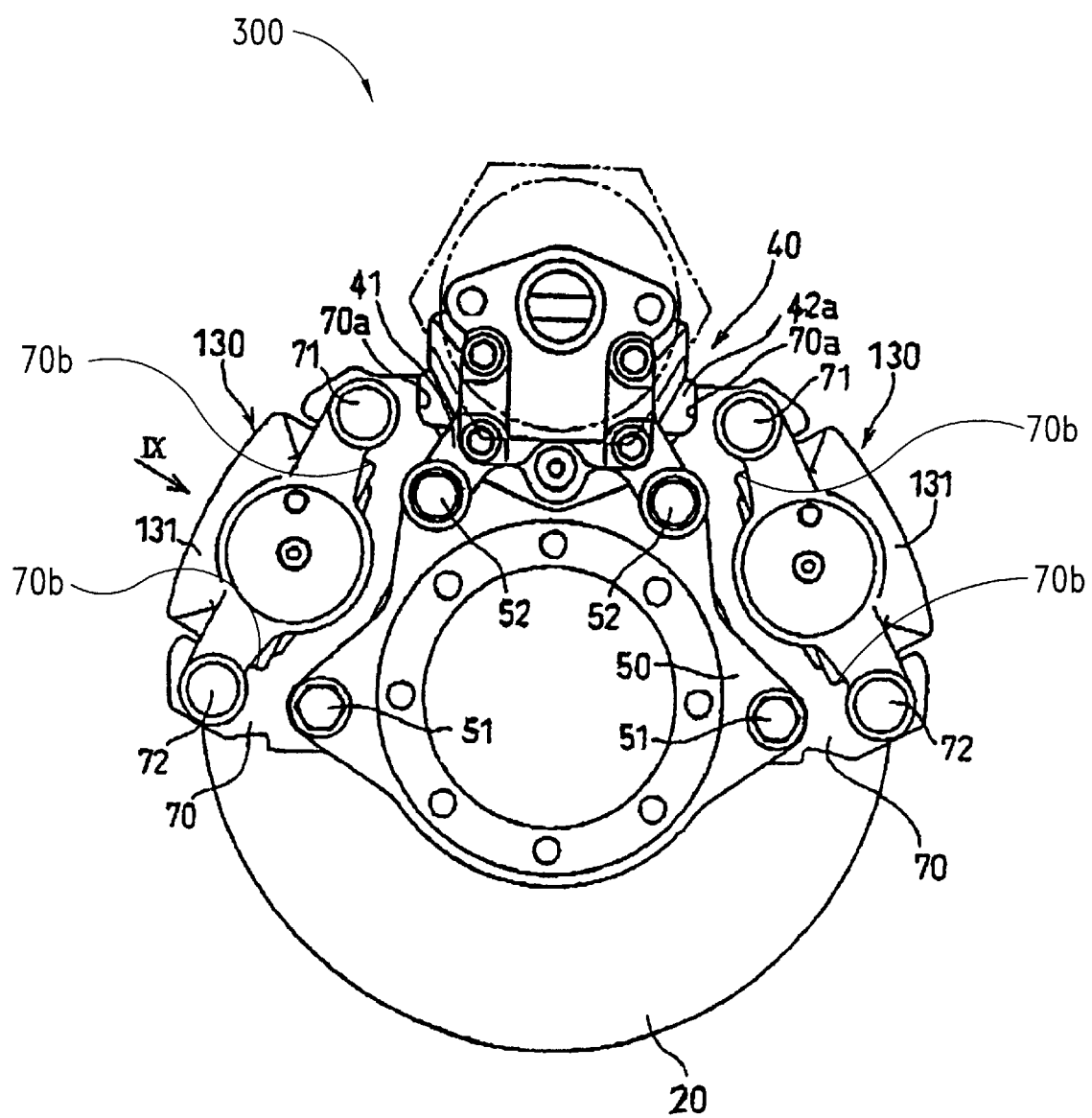
FIG. 8 is a front view of another embodiment of a disc brake assembly in accordance with the invention.
Figure 9:
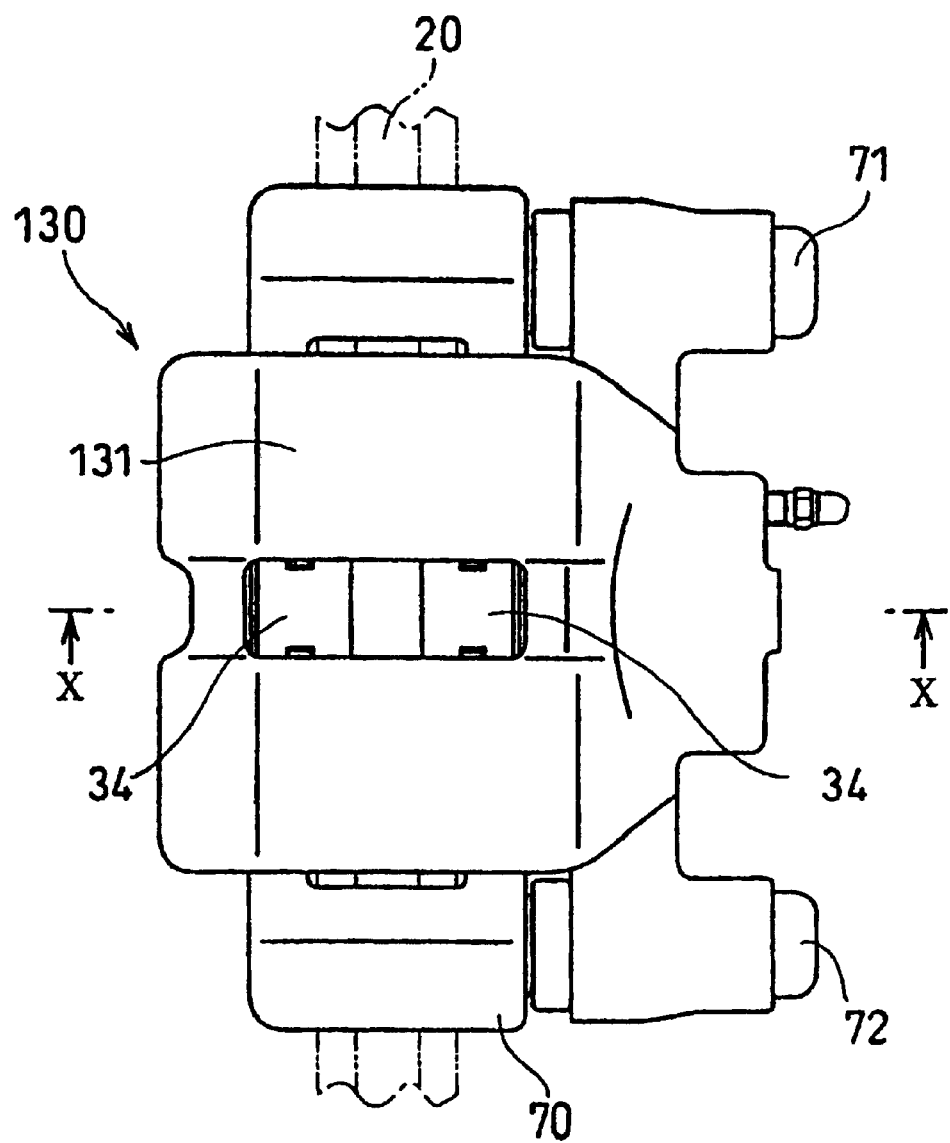
FIG. 9 is a plan view of the disc brake assembly of FIG. 8 as viewed in the direction of arrow IX.
Figure 10:
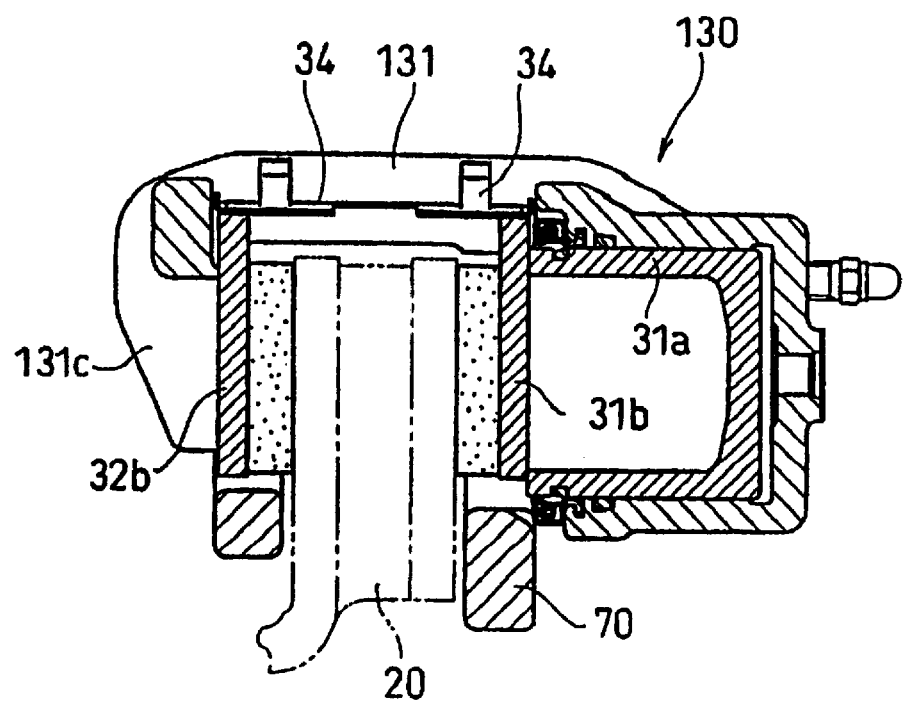
FIG. 10 is a cross sectional view of the disc brake assembly of FIG. 9 taken along line X—X.
Figure 11:
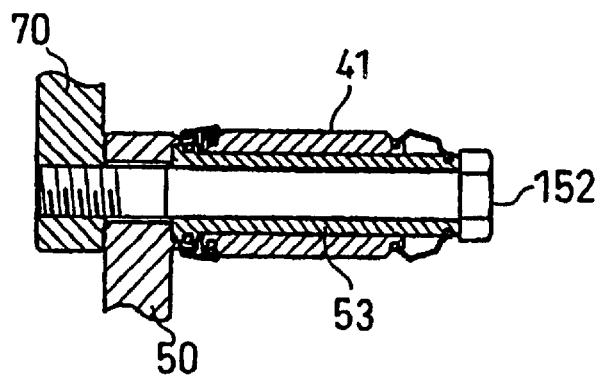
FIG. 11 is a cross sectional view of the disc brake assembly of FIG. 9 taking along line XI—XI.
Figure 12:
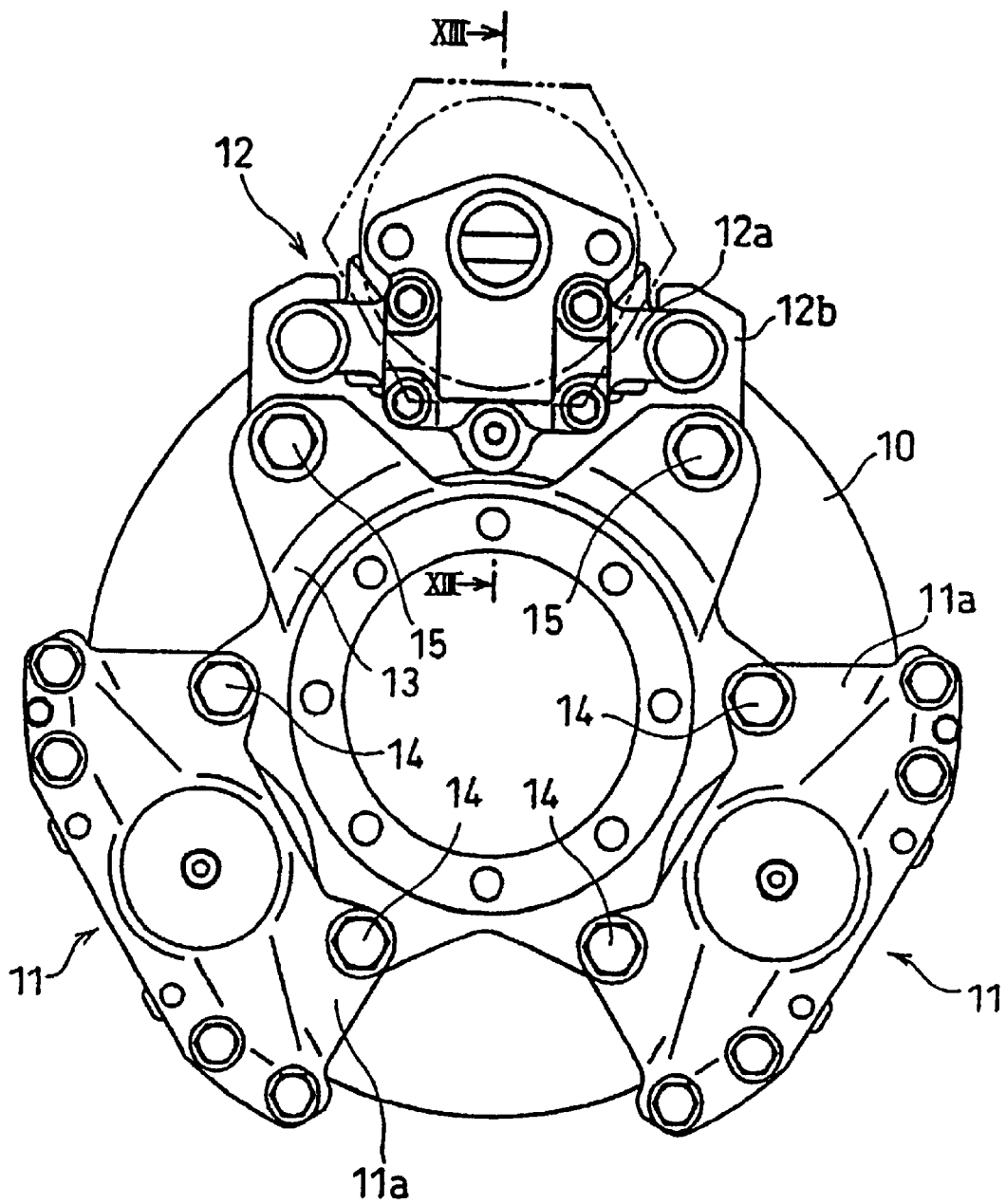
FIG. 12 is a front view of a disc brake assembly in accordance with the prior art.
Figure 13:
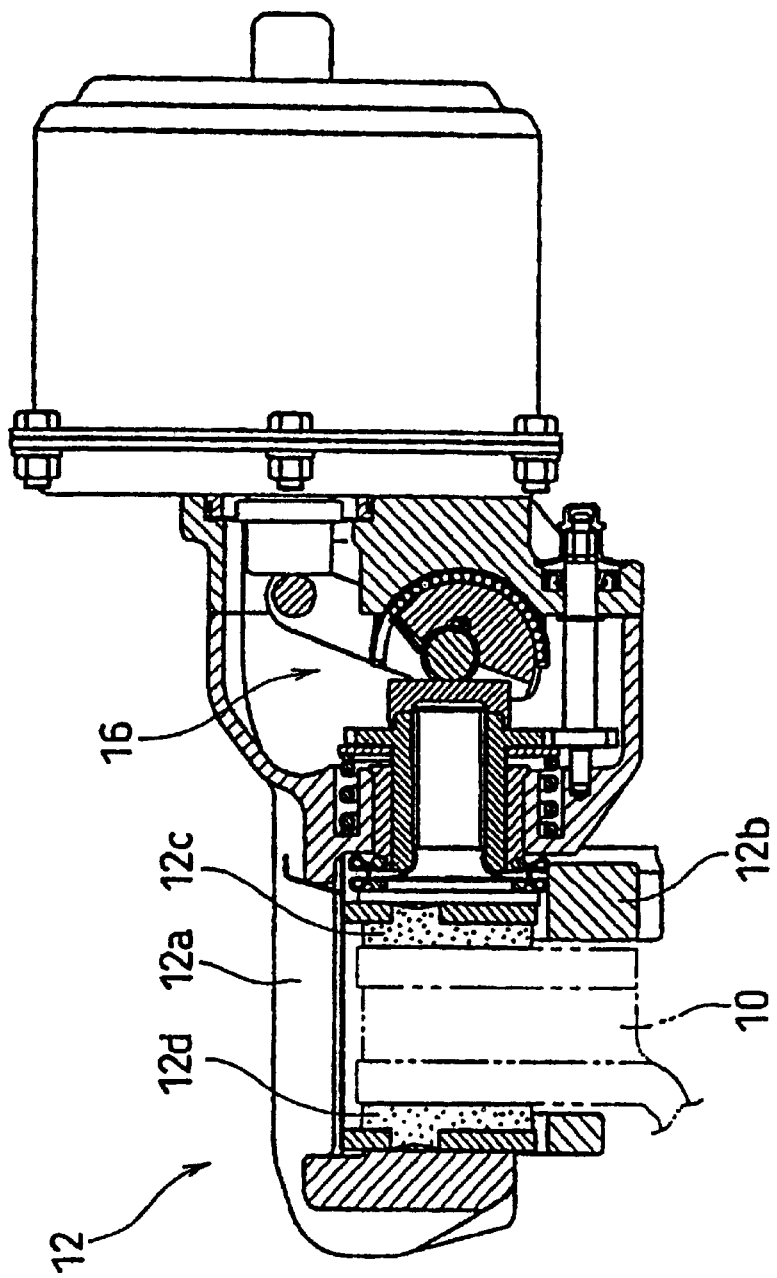
FIG. 13 is a cross sectional view of the disc brake assembly of FIG. 12 taken along line XIII—XIII.

In this embodiment, the guide bolts 52 are shared to fix both the guide bush 53 (see FIG. 11) on which the parking brake caliper 41 slides, and the carriers 70 comprise the floating-caliper type service disc brakes 130. Furthermore, an end surface of the inner and outer parking brake pads 42a and 42b (the inner parking brake pad 42a is shown in FIG. 8) of the parking disc brake 40 is provided on the respective rails 70a of the carriers 70, and the braking torque of the parking disc brake 40 is received by the carriers 70.

With respect to the braking operation of the floating-caliper type service disc brakes 130, the braking effect is caused by the inner pad 31b being pressed into the rotor 20 by the piston 31 a built in the inner side of the floating caliper 131, and the outer pad 32b being pressed into the rotor 20 by the reaction part 131c of the floating caliper 131.

As described above, the input portion of the floating-caliper type parking disc brake 40 is not limited to the spring chamber type. For instance, a cable may be used to pull the receiving part 62c of the operating lever 62.

Furthermore, the mechanical operating portion of the parking disc brake 40 is not limited to the type having the eccentric cam 62a. For example, a leverage type, a ball and ramp type, a wedge type, etc. may be used. In brief, the system only requires the mechanical floating-caliper type disc brake.

In the above-described embodiments, the guide bushes 53 (on which the parking brake caliper 41 of the parking disc brake 40 slides) and the service disc brakes 30 are both fixed on the mounting brackets 50 by the common guide bolts 52. The installation bolts 51 are not shared. In this way, the braking torque of the parking disc brake 40 is received by the component parts of the service disc brakes 30.

Furthermore, in the embodiment of the invention having floating-caliper type service disc brakes 130, the input part of the floating-caliper type service disc brakes 130 is not limited to the type in which the hydraulic pressure is directly supplied. The input source may be the hydraulic pressure but the floating-type service disc brake 130 may be the type in which the hydraulic pressure is indirectly supplied such as, for example, via a mechanical mechanism (e.g., an air-chamber type disc brake).

As is evident from the above-described embodiments, this invention has several advantages over the prior art. For example, the component parts of the hydraulic type service disc brake are provided in a line to use the torque-receiving parts of the mechanical type parking disc brake. Thus, the stationary part (i.e. the mounting bracket) may be designed smaller, which reduces the weight and the cost of the disc brake assembly. Furthermore, a carrier of the parking disc brake is not necessary, which also reduces weight and enables the device to be designed smaller. In addition, since the weight is lower, the fuel consumption rate of the vehicle is improved.

Another feature of the invention is that the installation fastener part of the guide bush where the caliper of the parking disc brake slides, and the installation fastener part for the service disc brake, may be shared. This advantageously reduces the number of component parts, and thus, the cost, weight, and assembly process. Another advantage is that either the fixed-caliper type or the floating-caliper type may be used for the service disc brake, which provides more flexibility.

It is readily apparent that the above-described invention has the advantage of wide commercial utility. It should be understood that although specific embodiments of the invention have been described herein for purposes of illustration, the specific form of the invention described above is intended to be representative only, and that various modifications within the scope of these teachings may be made without deviating from the spirit and scope of the invention, as may be apparent to those skilled in the art. Accordingly, reference should be made to the following claims in determining the fill scope of the invention.

What is claimed is:

1. A disc brake assembly, comprising:

two independent hydraulic type disc brakes configured for use as a service brake, the independent hydraulic type disc brakes being disposed in a circumferential arrangement along a disc rotor, one of the independent hydraulic type disc brakes comprising a first pair of brake pads and the other comprising a second pair of brake pads, both pairs of brake pads operable to cause a braking effect on the disc rotor by pressing against the disc rotor; and a mechanical floating-caliper type disc brake configured for use as a parking brake, the mechanical floating-caliper type disc brake comprising a third pair of brake pads and being positioned circumferentially between the two independent hydraulic type disc brakes, at least one component part of each of the independent hydraulic type disc brakes being coupled directly to the pads of the mechanical floating-caliper type disc brake such that at least one of the independent hydraulic type disc brakes serves as a torque-receiving part of the mechanical floating-caliber type disc brake and torque generated at the mechanical floating-caliper type disc brake is transferred directly to the components of the at least one of the independent hydraulic type disc brake.

2. The disc brake assembly of claim 1 wherein the independent hydraulic type disc brake is a fixed-caliper type.

3. The disc brake assembly of claim 2 wherein a caliper of the independent hydraulic type disc brake comprises the torque-receiving part.

4. The disc brake assembly of claim 3 wherein the mechanical floating-caliper type disc brake comprises a spring chamber operating mechanism.

5. The disc brake assembly of claim 2 wherein a carrier of the independent hydraulic type disc brake comprises the torque-receiving part.

6. The disc brake assembly of claim 5 wherein the mechanical floating-caliper type disc brake comprises a spring chamber operating mechanism.

7. The disc brake assembly of claim 2 wherein the mechanical floating-caliper type disc brake comprises a spring chamber operating mechanism.

8. The disc brake assembly of claim 1 wherein the independent hydraulic type disc brake is a floating-caliper type.

9. The disc brake assembly of claim 8 wherein the mechanical floating-caliper type disc brake comprises a spring chamber operating mechanism.

10. The disc brake assembly of claim 1 wherein the mechanical floating-caliper type disc brake comprises a spring chamber operating mechanism.

11. A disc brake assembly, comprising:

two independent hydraulic type disc brakes configured for use as a service brake, the independent hydraulic type disc brakes being disposed in a circumferential arrangement along a disc rotor, one of the independent hydraulic type disc brake comprising a first pair of brake pads and the other comprising a second pair of brake pads, both pairs of brake pads being operable to cause a braking effect on the disc rotor by pressing against the disc rotor;

a mechanical floating-caliper type disc brake configured for use as a parking brake, the mechanical floating-caliper type disc brake comprising a third pair of brake pads and being positioned circumferentially between the two independent hydraulic type disc brakes, at least one component part of each of the independent hydraulic type disc brakes being coupled to the pads of the mechanical floating-caliper type disc brake such that at least one of the independent hydraulic type disc brakes serves as a torque-receiving part of the mechanical floating-caliber type disc brake; and a tightening part for adjustably coupling the mechanical floating-caliper type disc brake and at least one hydraulic type disc brake to a stationary part of a vehicle.

12. A disc brake assembly for use with a rotor, comprising:

a pair of independent service disc brakes circumferentially positionable along the rotor, the pair of service disc brake comprising a corresponding first and second pair of pads; and a mechanical floating-caliper parking disc brake disposed between the independent service disc brakes, the parking disc brake comprising a third pair of pads, at least one component part of at least one service disc brake being directly used as a torque-receiving part of the parking disc brake and torque generated at the mechanical floating-caliper type disc brake is transferred directly to the components of the service disc brake.

13. The disc brake assembly of claim 12 wherein at least one of the independent service disc brakes is a fixed-caliper type disc brake.

14. The disc brake assembly of claim 12 wherein at least one of the independent service disc brakes is a floating-caliper type disc brake.

15. The disc brake assembly of claim 12 wherein the mechanical floating-caliper parking disc brake comprises a spring chamber operating mechanism.

16. The disc brake assembly of claim 12 wherein the torque-receiving part is provided on a caliper of the independent service disc brake.

17. The disc brake assembly of claim 12 wherein the torque-receiving part is a provided on carrier of the independent service disc brake.

18. A disc brake assembly for use with a rotor, comprising:

a pair of independent service disc brakes circumferentially positionable along the rotor, each of the independent service disc brakes comprising an independent first pair of pads;

a mechanical floating-caliper parking disc brake disposed between the independent service disc brakes, the parking disc brake comprising a second pair of pads, at least one component part of at least one independent service disc brake being used as a torque-receiving part of the parking disc brake; and a tightening part coupled to the parking disc brake and attachable to a stationary part of a vehicle, the tightening part being coupled to at least one of the independent service disc brakes.

\* \* \* \* \*